United States Patent [19]

Lautenschläger

[11] 4,272,207

[45] Jun. 9, 1981

[54] JOINING DEVICE

[75] Inventor: Karl Lautenschläger, Reinheim, Fed. Rep. of Germany

[73] Assignee: Karl Lautenschläger KG Möbelbeschlagfabrik, Reinheim, Fed. Rep. of Germany

[21] Appl. No.: 974,042

[22] Filed: Dec. 28, 1978

[30] Foreign Application Priority Data

Aug. 22, 1978 [DE] Fed. Rep. of Germany ....... 2836678

[51] Int. Cl.³ ............................................. B25G 3/00
[52] U.S. Cl. ................................... 403/231; 403/407
[58] Field of Search ............... 403/231, 343, 407, 408, 403/409, 230, 264

[56] References Cited

U.S. PATENT DOCUMENTS 4,089,614  5/1978  Harley ........................... 403/231 X
4,120,598  10/1978 Zernig ............................ 403/174 X

FOREIGN PATENT DOCUMENTS 1818201  9/1960  Fed. Rep. of Germany .
2308842  11/1973 Fed. Rep. of Germany ........... 403/264
2642488  12/1977 Fed. Rep. of Germany ........... 403/230

*Primary Examiner*—Andrew V. Kundrat

[57] ABSTRACT

A joining device for joining first and second board-like furniture parts meeting at an angle, preferably at right angles, with respect to each other, comprising: first and second fittings adapted to be sunk fixedly into first and second mortises respectively in said first and second furniture parts, said first fitting comprising a turn wedge with a snail-shaped locking wedge which is mounted in said first fitting for turning out of a starting position in which it is turned back into the fitting, into a locking position in which it emerges from said first furniture part. The second fitting has in its surface facing the first fitting with the turn wedge, an undercut recess into which the locking wedge can engage. The first and second fittins are in the form of substantially cylindrical plastic drive-in cups adapted to be driven or inserted into the first and second mortises respectively, while the mortises have orifices on one side face of the furniture parts to be joined together. The first mortise is broken-through to an edge of the first furniture part for the passage of the turn wedge, and the first fitting has a flattened portion at its side associated with this break-through such that the flattened portion open for the passage of the turn wedge is approximately flush with the edge when in its proper position of assembly.

14 Claims, 10 Drawing Figures

JOINING DEVICE

BACKGROUND

The invention relates to a joining device for the joining together of board-like furniture parts meeting preferably at right angles, the joining device consisting of two fittings which can be sunk fixedly each into a mortise in one of the furniture parts to be joined together, the first of them containing a locking disk embodying a sickle-shaped hook, which is mounted for rotation in the fitting from a starting position in which it is retracted within the fitting, to a locking position wherein it projects from the edge of its related furniture part, while the other fitting has an undercut recess in its surface facing the fitting provided with the locking disk.

A joining device of this kind is known (German Gebrauchsmuster 1,818,201), in which the two fittings are elongated, flat plastic pieces, one of which is inserted into a mating recess cut in the edge of the one board-like furniture part and the other is inserted into a mating recess cut in the face of the other, corresponding furniture part, and then they have to be screwed to the furniture part. The manufacture of the elongated recesses or slots required for the installation of the fittings in the furniture part by the use of routing bits is laborious and time-consuming. The assembly of the furniture parts cannot be fully automated on account of the need to use screws. The known joining device therefore has not been accepted in practice, also because its load-bearing capacity, i.e., its resistance to the pulling of the rotary wedge out of the undercut slot, falls short of the requirements.

THE INVENTION

On the other hand, the object of the invention is to further improve the known joining device such that it will be able to be installed automatically in a simple and rapid manner by methods presently employed in furniture manufacture, and at the same time to achieve a substantial improvement in its load bearing capacity.

Setting out from a joining device of the kind mentioned above, this object is achieved in accordance with the invention by constructing both of the fittings in the form of substantially cylindrical plastic cups which can be set or driven into mating mortises provided in one face side of each of the furniture parts to be joined together, the mortise receiving the first fitting, i.e., the one provided with the locking disk, having an opening cut through the narrow edge of the furniture piece for the passage of the locking disk, and the fitting being flattened on the side associated with this opening such that the open flat provided for the passage of the locking disk will be approximately flush with the edge of the furniture part. The gains or mortises of circular cross section which are needed for the accommodation of fittings in cup form can be produced quickly and simply by means of end mills or drilling tools. Furthermore, the cup-shaped fitting has proven desirable because it can be installed by pressing it into the undersized mortise in a rapid and lasting manner and—what is especially important—automatically as well.

If the locking hook of the joining device consists of a rim extending over more than 180° above and below the margin of a disk provided with pivots for mounting in the corresponding fitting, whose locking surfaces situated on opposite sides of the disk and facing the pivots engage, when in the proper joining position, the inner surfaces of two abutments projecting from opposite sides of an elongated slot in the second fitting, the first fitting, which is provided with the locking disk, is composed preferably of a cup consisting of a bottom and a cylindrical wall which is integral therewith and extends as far as the area of the flat, and of an obturator inserted into the open side of the cup, the sockets for the pivots of the locking disk being provided in the floor and in the obturator. The locking disk, therefore, can be inserted into the pivot socket in the cup when the obturator is removed, and then the cup is closed by putting the obturator into it. In addition to providing for simple and rapid installation, this division of the fitting is also advantageous because the injection molding dies for the cup and the obturator are of relatively simple design and therefore can be manufactured economically. The sockets for the pivots of the locking disk are injection molded integrally and continuously in the cup bottom and in the obturator. The tightening force exerted on the locking disk in the assembly of a cabinet, therefore, is not applied to the fitting in the area of a parting line, as it would be if, in a fundamentally conceivable injection molded fitting, the fitting were divided into halves along its longitudinal vertical central planes. In comparison with a fitting divided in this manner, the first fitting composed in accordance with the invention of a cup and an obturator has a considerably greater load bearing capacity.

The first fitting in that case is preferably assembled such that its obturator is in the interior and its bottom is at the orifice of the mortise in the corresponding furniture part, because this will forestall any unintentional separation of the obturator from the cup. It is recommendable that the bottom project slightly radially beyond an outer surface of the circumferential wall and thus to form a depth stop for the pressing or driving of the fitting into the mortise in in the corresponding furniture part. Even if the mortise should accidentally be bored slightly too deep in the furniture part, this can cause no misalignment of the fitting relative to the corresponding furniture part, because when the fitting is pressed into the mortise the depth stop will engage the upper, flat side of the furniture part in the correct position and then can not be pressed any further into the mortise.

The radially projecting portion of the bottom can furthermore be enlarged on the side opposite the flat to form a large-area bearing flange, from whose underside a fastening stud projects at a distance from the circumferential wall of the cup, which can be additionally anchored in a bore in the furniture part. This not only increases the load bearing capacity of the fitting, but also the additional fastening stud assures the correct angular alignment of the fitting such that the flattened side of the fitting will be precisely flush in the opening in the side of the mortise in the furniture part.

The obturator is preferably snapped at its edge into a circumferential groove provided on the inside surface of the circumferential wall adjacent the open end of the cup, in which case it will have on the side facing away from the flat at least one wall section projecting into the interior of the cup and engaging a complementary recess formed in the interior of the cup. By the form-fitting engagement of the projecting wall section into the complementary recess in the cup, the load bearing capacity of the fitting is additionally increased.

If the first fitting is made without the above-mentioned bearing flange provided with the additional fastening stud, the obturator can also be made integrally with the cup, being attached to it by a strap.

To facilitate the alignment of the fittings which are to be joined together when a piece of furniture is assembled, the obturator can have in the area of the flat on the fitting that contains the locking disk a projecting extending in the direction of the second fitting, and in the second fitting a complementary recess is then provided to accommodate the projection when the two fittings are joined together.

Since the load bearing capacity of the first fitting also depends on the transmission of the pulling force of the locking disk to large bearing surfaces on the fitting, the bearings provided for the locking disk are formed by bores in abutments made integrally with the bottom in the one case and the obturator in the other and projecting from the bottom toward the obturator and from the obturator toward the bottom, respectively, at least the bore in the bottom passing all the way through the abutment and the bottom so that the end face of the pivot of the locking disk, which is situated in the bore and provided with a tool engaging recess, will be accessible for engagement by a turning tool. The abutments provided with the bearings project from the bottom and from the obturator to such a degree that the gap remaining between them corresponds approximately to the thickness of the web of the locking disk. The effective bearing length is thus virtually equal to the height of the fitting minus the very slight thickness of the web of the locking disk.

The axis of rotation of the locking disk is preferably disposed with a slight tilt in the longitudinal central plane of its fitting such that its end on the side of the bottom of the fitting will be farther away from the second fitting than the end on the obturator side. This results in an advantageous angular pull when the two fittings are drawn together.

The second fitting is also in the form of a drive-in cup having a bottom at the orifice of the mortise in the corresponding furniture part and a cylindrical circumferential wall injection molded integrally therewith, the slot provided with the locking abutments being provided in the bottom. The circumferential wall of the second fitting is reinforced against radial compression by at least two, preferably three or more ribs diagonally joining opposite areas of the inner surface of the circumferential wall and offset angularly from one another.

The elongated slot in the bottom of the second fitting, from whose inner surface the locking abutments engaged by the locking disk project, extends preferably only over a portion of the total width of the bottom, so that strap-like portions of the bottom will remain alongside the slot, which will resist being spread apart transversely of their length.

Lastly, it is also recommendable to make the bottom of the second fitting slightly thicker in the area outside of its engagement with the flat on the first fitting than in the area of engagement, and to make it project slightly in this area beyond the outer surface of the circumferential wall, so that in this fitting, too, a depth stop will be formed for the pressing or driving of the fitting into the mortise in the corresponding furniture part.

The invention is further explained in the following description of two embodiments in conjunction with the drawing, wherein.

Figure 1:
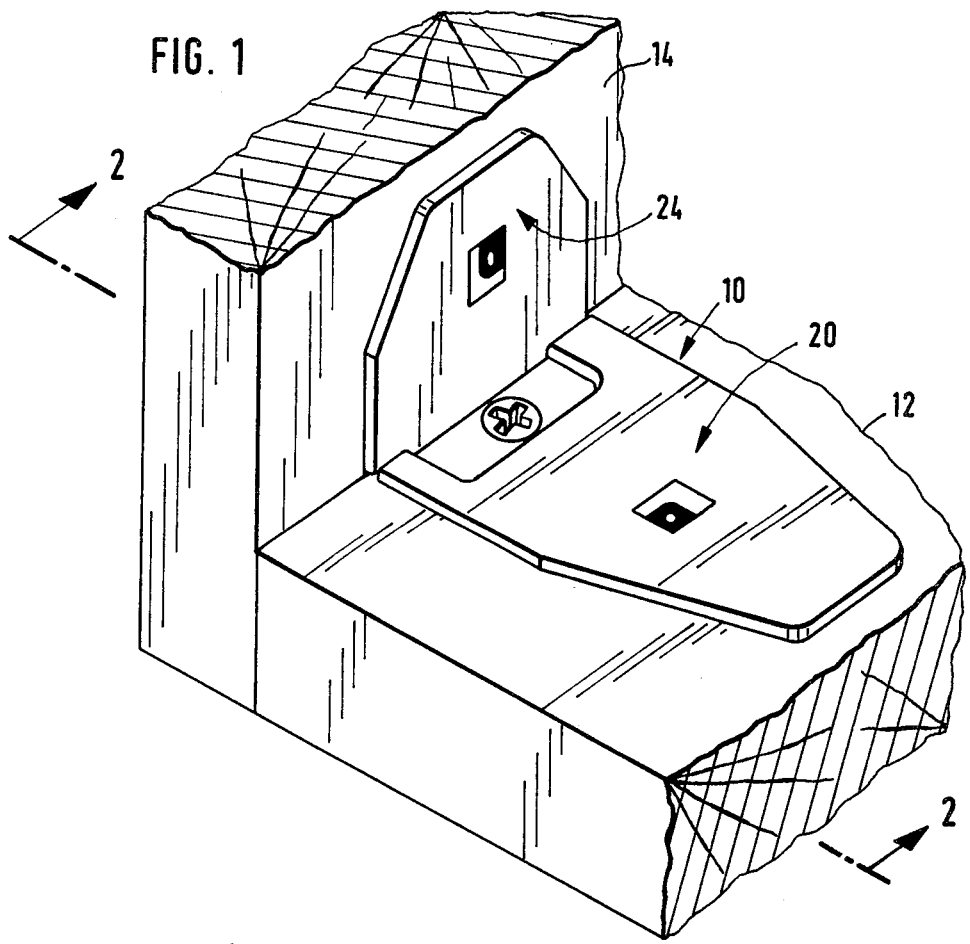
FIG. 1 is a perspective view of two board-like furniture parts which are joined together by a first embodiment of a joining device of the invention.
Figure 2:
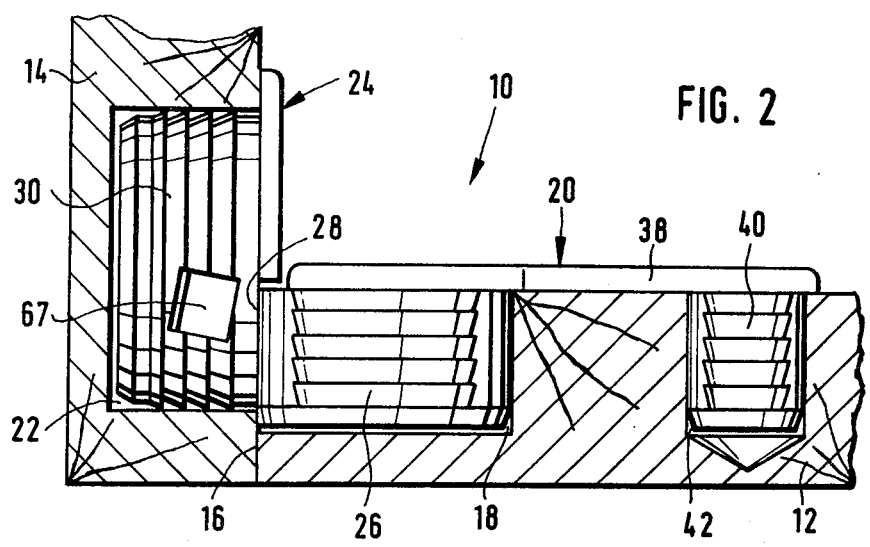
FIG. 2 is a cross-sectional view taken along line 2—2 of FIG. 1, in which the joining device does not, however, appear in cross section, but in a side elevational view.
Figure 3:
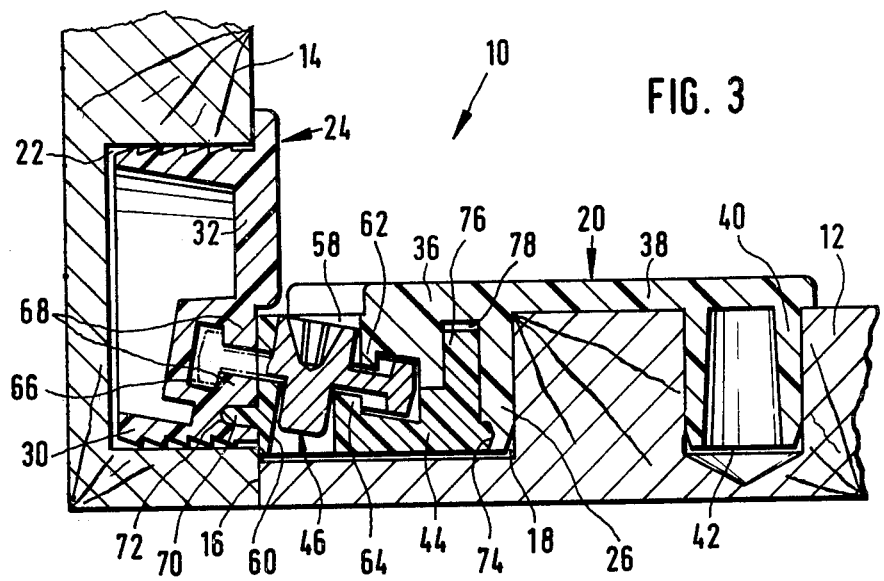
FIG. 3 is also a cross-sectional view taken along line 2—2 of FIG. 1, in which, however, the joining device is also cross-sectioned, i.e., is represented in a central cross-section.

The joining device of the invention, represented in FIGS. 1 to 3 and designated as a whole by the number 10, serves as illustrated for the joining together of two board-like furniture parts 12 and 14 which meet at right angles and which might be, for example, the bottom and one side wall of a cabinet. The cabinet bottom 12 is fastened at one edge 16 to a face of the sidewall 14 by tightening a first fitting 20 of the joining device 10, fastened at least partially in a mortise 18 in the cabinet bottom 12, against a second fitting 24 which is likewise largely sunk in a mortise 22 in the cabinet side wall 14. However, if the edge of the side wall 14 is to be fastened to one face of the bottom 12, the fitting 20 will be associated with the side wall and the fitting 24 with the bottom. The recess 18 is cut on the inside of the cabinet bottom 12 with an end mill so close to the edge 16 that the end mill cuts slightly through the edge, i.e., the mortise 18 is open at the edge 16. The first fitting 20 has, in its area within the mortise, the form of a substantially cylindrical cup 26, except that it has a flat at 28 on the side associated with the opening on the side of mortise 18, this flat being flush with the edge of the furniture piece.

The mortise 22 of the second fitting 24 is cut at some distance from the edge of side wall 14 by means of an end mill, and therefore it has a cylindrical cross section. The second fitting 24 is therefore constructed in the form of a cup 30 in that portion of it which is situated in the mortise 22, and its largely closed bottom 32 closes the orifice of mortise 22, while it is open at the bottom of the mortise. In the portion in which the cup bottom 32 faces the flat 28 of the first fitting, it is flush with the inside of the side wall 14, while it is slightly thicker in the opposite area 34, i.e., it projects above the inside of the side wall 14 and here it projects radially beyond the edge of the circumferential wall of the cup 30, so that the underside of this radially projecting area forms a stop limiting the depth to which the fitting can be driven or pressed into the mortise 22 by engaging the inside surface of the side wall 14. The cup 26 of the first fitting 20 also has a depth stop having a similar function; the bottom 36 of this cup, which is approximately at the level of the inside of the cabinet bottom 12 projects slightly above the upper surface of the cabinet bottom and, with the exception of the area of the flat 28, is enlarged to form a radially extending flange 38 whose underside forms the depth stop mentioned above. The flange 38, which is enlarged to a considerable extent on the side opposite the flat 28, is provided on its bottom, at some distance from the plug, with a fastening plug 40 which engages a bore 42 in the cabinet bottom 12 and additionally fastens the fitting 20 and aligns it longitudinally. The stud 40 has retaining beads 41 of saw-tooth cross section projecting from the plug circumference, which, after the fitting 20 has been driven in, cut into the walls of the bore 42 and thus provide additional security against the tearing out of the stud 40 and hence of the fitting 20. In the direction of pull, i.e., in the direction of the longitudinal central axis, the stud's circumferential wall facing the second fitting 24 is, however, plain, so as to assure that the plug will have a broad support on the wall of the bore in the direction of stress. The opposite side of the circumferential wall of the cup 26, on the other hand, is kept smooth so that no interlocking of the teeth with the next fitting 20 can take place when the fittings are fed automatically to the installing machine.

The open bottom of the cup 26 is closed with a snap-in obturator 44 which reinforces the cup 26 against radial collapse of its circumferential wall.

To the extent described to this point, the fittings 20 and 24 are made of plastic by injection molding.

Figure 7:
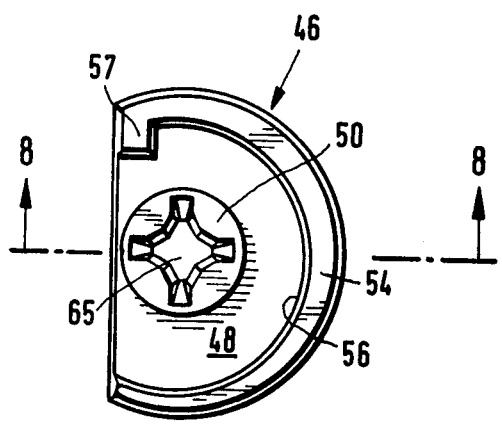
FIG. 7 is a top view of the locking disk used to join the fittings together.
Figure 8:
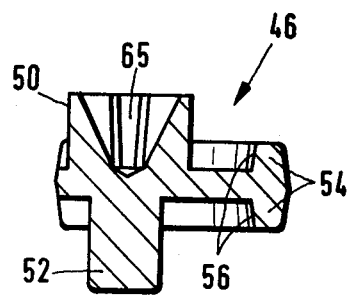
FIG. 8 is a cross-sectional view taken in the direction of the arrows 8 of FIG. 7.

It can be seen in FIG. 3 that the locking disk 46, which is also represented separately in FIGS. 7 and 8, is rotatably mounted in the interior of the cup 26, and it consists preferably of a disk made of metal by the die casting method, having a web 48 which is circular over an angle of slightly more than 180° and has a rectilinear edge over the remaining portion, from whose top and bottom the pivots 50 and 52, respectively, project. A raised rim 54 is formed on each side of the web 48 and forms the locking hook whose width increases gradually from one end to the other as measured parallel to the surface of the disk web, so that its surfaces facing the pivots form helical locking surfaces. At the thicker end of this sickle-shaped locking hook 54 there is an end stop 57 extending a short distance radially inwardly, which, when the fitting 20 is placed against fitting 24, will make contact with the outer surface of the latter fitting 24, thereby deflecting the locking disk 56 to its starting position.

The pivots 50 and 52 of the locking disk 46 are journaled in a slightly inclined attitude in bearings provided in the cup 26 and in the obturator 44. These bearings are constituted by through bores 58 and 60 in the cup bottom 36 and in the obturator 44, the bores being provided for the achievement of a load-bearing surface area sufficient for the accommodation of high tightening forces in abutments 62 and 64, respectively, which project toward one another from the bottom 36 of the cup 26 and from the obturator 44, respectively, to such an extent that the gap remaining between them wil just amount to the thickness of the web portion 48 of the locking disk 46. In the end face of the pivot 50, which is accessible in the open bore 58, there is provided a tool engagement recess 65 in the form of a cross slot into which the blade of a cross-slot screwdriver can be inserted whereby the rotary wedge can be turned from the position drawn in solid lines in FIG. 3 to the locking position represented in broken lines. In this locking position, the rim 54 forming the locking hook enters into an elongated slot 66 in the bottom 32 of the second fitting 24 (see also FIG. 5). Two abutments 68 project one from each of the opposite lateral faces of the slot 66, their height being such that a gap remains between them corresponding approximately to the thickness of the web 48 of the locking disk 46. The inwardly facing backs of the locking abutments 68 are arcuately defined surfaces whose radius corresponds approximately to the radius of the locking surfaces 56 of the locking disk 46, the locking abutments 68 being offset excentrically from the center of the second fitting 24 in accordance with the offset of the locking surfaces 56 with respect to the circumference of the locking disk 46. In order to join together the two fittings 20 and 24 when they have been brought into properly aligned engagement, it is necessary, therefore, only to turn the locking disk 46 clockwise from the starting position represented in solid lines in FIG. 3. The thin tip of the locking hook 56 situated at the bottom in FIG. 7 will then enter into the slot 66 in the second fitting and its locking surfaces 56 wil catch behind the locking abutments 68, as is indicated in FIG. 3 in broken lines. Due to the helical configuration of the locking surfaces 56 with respect to the axis of rotation of the locking disk 46, as the turning of the hook continues a pull is produced by which the two fittings are tightened very forcibly together.

The term "snail-shaped" or "helical" as used herein in connection with the locking wedge and in particular the locking surfaces 56 is understood to include not only curves or surfaces extending exactly geometrically like an Archimedes' spiral or a logarithmic spiral but also a curve whose distance in relation to a circle upon rotation within the area of engagement under consideration here (that is, over more than 180° but less than 360°) steadily or gradually increases or decreases. Aside from the Archimedes' spiral or logarithmic spiral for instance an involute curve or other geometrical spiral curve may be used and even a circular curve in which the center of the circle with respect to the reference circle is offset, that is, the circles extend eccentrically with respect to each other.

Figures 5, 5A, 5B:
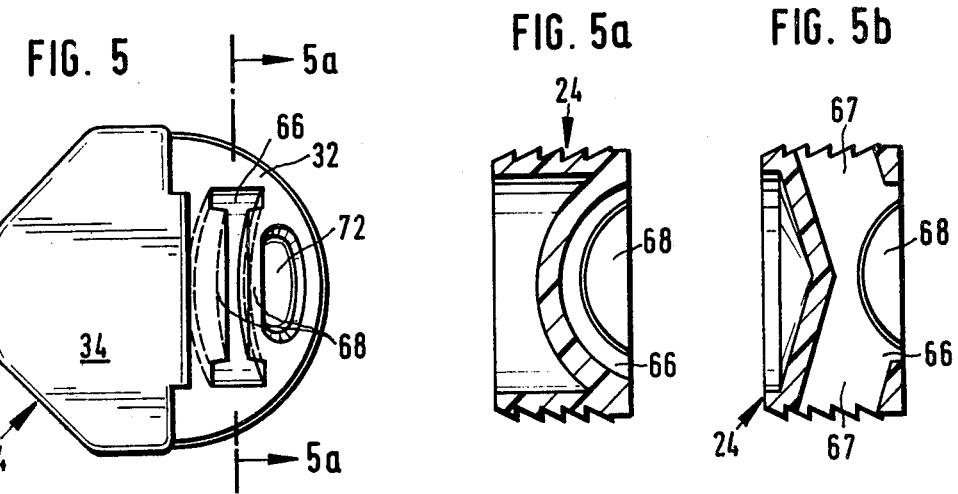
FIG. 5 is a view of the second fitting of the joining device of the invention, which is shown in FIGS. 1 to 3 in the vertical furniture part.
FIG. 5a is a cross-sectional view of the second fitting shown in FIG. 5, taken in the direction of the arrows 5a of FIG. 5.
FIG. 5b is a cross-sectional view taken through a slightly modified embodiment of the second fitting, also in the direction of arrows 5a of FIG. 5.

As seen in FIG. 5, the slot 66 extends over only a portion of the width of the cup bottom 32. The portions of the cup bottom remaining between the ends of the slot and the circumference of the cup bottom act against any widening of slot 66 due to the wedging apart of its lateral surfaces and hence of its locking abutments 68.

The second fitting 24 will be especially resistant to the above-mentioned wedging open of the slot 66 if the slot is provided with a continuous wall around it, in the manner shown in FIG. 5a.

Alternatively, however, the fitting 24 can also have lateral openings 67 as in FIG. 5b, in which case the design of the injection molding die for the production of fitting 24 is simplified in that it becomes possible to provide mold inserts for the production of the undercut surfaces of the locking abutments 68, which can then be extracted laterally through these openings 67. Nevertheless, it is to be noted that the production of the fitting with the recess shown in FIG. 5a is possible by the methods of the tool and die making art.

In order to assure the correct alignment of the two fittings 20 and 24 before they are tightened together by means of the locking disk 46, the first fitting 20 has on its flat 28 a projection 70 extending towards the second fitting, with which there is associated a recess 72 of complementary shape in the second fitting 24 under the slot 66. The complementary shape of projection 70 and of the recess 72 assures that the two fittings, when assembled, will be positively aligned with one another such that the rotary wedge 46 will be precisely opposite the recess 66.

Figure 4:
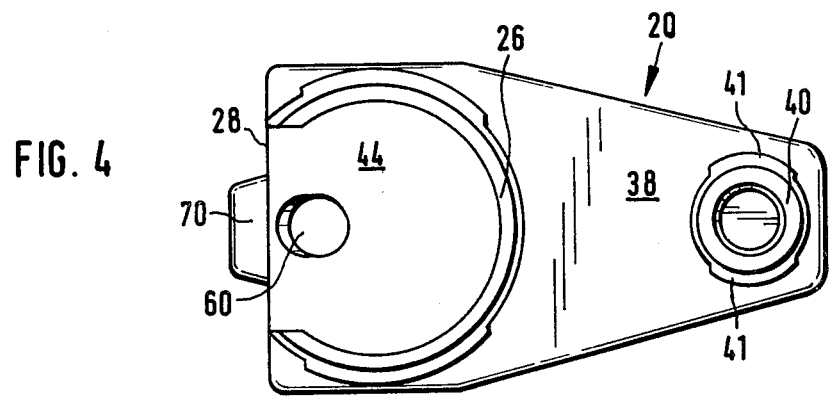
FIG. 4 is a view of the bottom of the first fitting of the joining device of the invention, which is shown in FIGS. 1 and 3 in the furniture part.

The projection 70 of fitting 20 is provided on the obturator 44 which plugs the bottom of the cup 26 of fitting 20. This obturator 44, which in the embodiment represented in FIGS. 1 to 4 is made as a separate component, is, as shown in FIG. 4, snapped into a circumferential groove 74 provided in the inner surface of the cup 26 adjacent the bottom edge thereof. Since the obturator 44 receives the lower pivot 52 of the locking disk 46, a portion of the tension produced when the locking disk is tightened is transmitted to it. To prevent this portion of the tightening force from pulling the obturator 44 out of the circumferential groove 74 towards the flat 28, a wall section 76 is provided on the side farthest from the flat 28 and projects into the interior of the cup, engaging an associated complementary recess 78 in the interior of the cup. Therefore, the obturator 44 is additionally held in cup 26 against the tightening force, in a positive manner.

In the direction of the bottom of the mortise 18, however, the obturator 44 is held in the circumferential groove 74 only by the above-mentioned snap action. Now, if this mortise 18 happens to be slightly deeper than the cup 26 of the first fitting 20 driven into the mortise, and vertical pressure acts upon the wall 14, the obturator 44 with its projection 70 engagedin the recess 72 of the second fitting 24 might be forced out of its fitting. This, however, is prevented by the bottom edge of the portion 34 protruding from the wall 14, this edge being so made and disposed that when the two fittings are in the properly joined state it will rest on the top side of the fitting 20.

Figure 6:
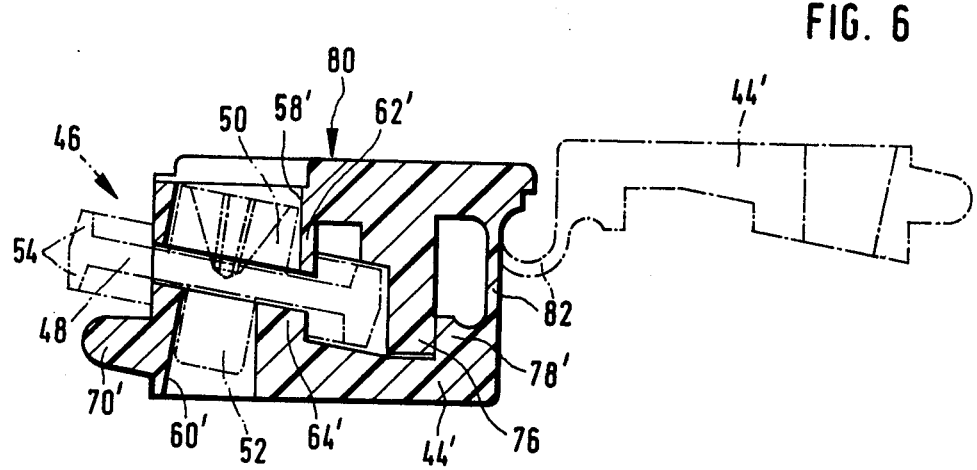
FIG. 6 is a cross-sectional view corresponding to FIG. 3, taken through the first fitting of a second embodiment of the joining device of the invention, which is associated with the board-like furniture part represented in the horizontal position in FIGS. 1 to 3.

FIG. 6 shows a modified embodiment of the first fitting which is generally identified by the number 80. Fitting 80 is largely the same as fitting 20 as regards the disposition of the locking disk and cooperation with the second fitting 24. Since parts of fitting 80 which are the same as those of fitting 28 are provided with the same but primed reference numbers, it will suffice to refer to the description of fitting 20 with regard to what is the same, and to describe the differences briefly. The elongated flange 38 on fitting 20, with the additional fastening stud 40, is not used in the case of fitting 80, and the latter is accordingly smaller and less conspicuous and consists virtually only of the cup 26 closed by the obturator 44'. In contrast to fitting 20, the obturator 44', however, is integral with the cup 26, i.e., the entire fitting 80 with the exception of the locking disk 46 is injection molded in one piece of plastic, and the corresponding injection molding die is so constructed that the obturator part is produced in the position represented in broken lines in the drawing, in which it is held together with the cup 26 by a thin, resiliently deformable link 82, the cup 26 being interrupted adjacent this link. The link 82 acts, therefore, like a flexible hinge and permits the obturator 44' to be swung from the position represented by broken lines to the proper position represented by solid lines and snapped into the cup 26. On account of the lack of the additional stud 40, the fitting 80 cannot be loaded to the same extent as the fitting 20, but it is still superior to fittings of similar, known joining devices.

I claim:

1. A joining device for joining first and second board-like furniture parts meeting at an angle, preferably at right angles, with respect to each other, comprising: first and second fittings adapted to be mounted fixedly into first and second mortises respectively in said first and second furniture parts, said first fitting comprising a turn wedge with a spiral-shaped locking wedge which is mounted in said first fitting for turning out of a starting position in which it is turned back into said first fitting, into a locking position in which it emerges from said first furniture part, said second fitting having in its surface facing said first fitting an elongated undercut recess into which the locking wedge can engage, said first and second fittings being in the form of substantially cylindrical, plastic drive-in cups adapted to be inserted into said first and second mortises respectively, said first and second mortises having orifices on one side face of said first and second furniture parts respectively, said first mortise being broken-through to an edge of said first furniture part for the passage of said turn wedge, and said first fitting having a flattened portion at its side associated with said break-through such that the flattened portion open for the passage of the turn wedge is approximately flush with said edge when in its proper position of assembly, said locking wedge being formed by a marginal molding projecting in opposite directions over more than 180° from the marginal portion of a disk-like base part provided with pivots for mounting in said first fitting, said marginal molding having surfaces on opposite sides of said base part, which surfaces extend spiral-like and face said pivots and engage behind inner surfaces of two locking abutments projecting from opposite lateral surfaces of said elongated recess in said second fitting, said first fitting being composed of a cup having a bottom and integral therewith a circumferential wall which is cylindrical with the exception of said flattened portion and which is open on the side opposite to said bottom, and an obturator inserted in the open side of said cup, and bearings for the pivots of the turn wedge being provided in said bottom and in said obturator.

2. A joining device according to claim 1, in which the obturator of the first fitting is situated in the interior and its bottom at the orifice of the mortise in said first furniture part, said bottom projecting radially over the outer surface of the circumferential wall at least in a partial range and thus constituting a depth stop for the pressing or driving of the first fitting into the mortise.

3. A joining device according to claim 2, wherein the radially projecting part of the bottom is enlarged to a large-area bearing flange on the side opposite said flattened portion, from whose bottom facing the first furniture part a fastening stud projects at a distance from the circumferential wall of the cup, and adapted to be anchored additionally in a bore in said first furniture part.

4. A joining device according to any one of claims 1, 2 or 3, wherein the obturator has a margin adapted to be snapped flush with a circumferential groove provided adjacent the open end of the circumferential wall in the inner surface thereof, said obturator having on the side facing away from said flattened portion at least one wall section projecting into the cup interior and engaging a complementary recess formed in the cup interior.

5. A joining device of claim 1 or 2, comprising a film hinge, and wherein the obturator of the first fitting is made cohering in one piece with the cup by said film hinge.

6. A joining device according to any one of claims 1, 2 or 3, wherein the obturator has adjacent the flattened portion on the first fitting a projection extending towards the second fitting and wherein in the second fitting there is provided a complementary recess accommodating the projection when the two fittings are in the joined position.

7. A joining device according to any one of claims 1, 2 or 3, wherein the bearings for the turn wedge are formed by bores in abutments made integrally with the bottom and in the obturator respectively, which abutments project from the bottom towards the obturator and from the obturator towards the bottom, respectively, at least the bore on the bottom passing all the way through the abutment and the bottom, the pivot of the turn wedge having one end face which is provided with a tool engaging recess and is situated in the bore on the bottom side so as to be accessible for the engagement of a turning tool.

8. A joining device according to claim 7, wherein the abutments provided with the bearings project to such a degree from the bottom and from the obturator that the gap remaining between them corresponds approximately to the thickness of the disk-like base part of the turn wedge.

9. A joining device according to any one of claims 1, 2 or 3, wherein said turn wedge has an axis of rotation, and said cup has a central axis, said axis of rotation lying in a longitudinal central plane of the first fitting and being inclined at a slight angle from the central axis of the cup such that its end on the bottom side is farther away from the second fitting than its end on the obturator side.

10. A joining device according to any one of claims 1, 2 or 3, wherein the second fitting is in the form of a drive-in cup whose bottom faces the orifice of the mortise in the second furniture part and has an integrally injection molded cylindrical circumferential wall, and wherein the recess provided with the projecting locking abutments is provided in the bottom.

11. A joining device according to claim 10, comprising at least two supporting walls reinforcing the circumferential wall of the second fitting against radial compression, said supporting walls diagonally joining opposite areas of the inner surface of the circumferential wall and being offset at angles from one another.

12. A joining device according to claim 10, wherein the recess in the bottom of the second fitting is elongated and extends over only part of the total breadth of the bottom.

13. A joining device according to claim 11, wherein the bottom of the second fitting is, in the area outside of its engagement with the flattened portion of the first fitting, slightly thicker at the outside than in the area of engagement and projects above the outer surface of the circumferential wall and thus forms a depth stop for the pressing or driving of the fitting into the mortise in the second furniture part.

14. A joining device according to claim 12, wherein the bottom of the second fitting is, in the area outside of its engagement with the flattened portion of the first fitting, slightly thicker at the outside than in the area of engagement and projects above the outer surface of the circumferential wall and thus forms a depth stop for the pressing or driving of the fitting into the mortise in the second furniture part.

* * * * *